United States Patent [19]
Kawai et al.

[11] Patent Number: 5,691,590
[45] Date of Patent: Nov. 25, 1997

[54] ALTERNATOR WITH MAGNETIC NOISE REDUCTION MECHANISM

[75] Inventors: Junji Kawai, Kariya; Atsushi Umeda, Anjo, both of Japan

[73] Assignee: Nippondenso Co., Ltd., Kariya, Japan

[21] Appl. No.: 470,595

[22] Filed: Jun. 6, 1995

Related U.S. Application Data

[63] Continuation-in-part of Ser. No. 139,707, Oct. 22, 1993, abandoned.

[30] Foreign Application Priority Data

Oct. 23, 1992 [JP] Japan .................. 4-286249
Nov. 20, 1992 [JP] Japan .................. 4-335175

[51] Int. Cl.⁶ .................. H02K 3/48; H02K 1/12
[52] U.S. Cl. .................. 310/180; 310/184; 310/254; 310/68 D
[58] Field of Search .................. 310/179, 180, 310/184, 263, 208, 198, 207, 254, 62, 42, 68 D

[56] References Cited

U.S. PATENT DOCUMENTS

| | | | |
|---|---|---|---|
| 4,356,419 | 10/1982 | Boer et al. | 310/217 |
| 4,419,618 | 12/1983 | Gretsch | 322/7 |
| 5,013,953 | 5/1991 | Odell | 310/254 |
| 5,122,705 | 6/1992 | Kusase et al. | 310/68 D |
| 5,214,336 | 5/1993 | Schmidt et al. | 310/254 |
| 5,260,620 | 11/1993 | Morrill | 310/185 |
| 5,343,105 | 8/1994 | Sakabe et al. | 310/179 |
| 5,394,041 | 2/1995 | Oberdorfer-Bogel | 310/64 |
| 5,502,341 | 3/1996 | Sato | 310/42 |

FOREIGN PATENT DOCUMENTS

| | | |
|---|---|---|
| 3226251 | 10/1991 | Japan . |
| 6141497 | 5/1994 | Japan . |
| 6165422 | 6/1994 | Japan . |

*Primary Examiner*—Thomas M. Dougherty
*Assistant Examiner*—Jonathan Link
*Attorney, Agent, or Firm*—Cushman, Darby & Cushman IP Group of Pillsbury Madison & Sutro LLP

[57] ABSTRACT

In an alternator for a vehicle having a field coil for generating rotating magnetic field and stator coils for generating alternating current voltages in response to the rotating magnetic field, the stator coils are grouped and wound in a dual winding system. In order to reduce magnetic noise, a first group of coils are provided in contact with a stator core and the second group coils. The first and second group of coils are shifted from each other by π/3 radian in electrical angle.

16 Claims, 7 Drawing Sheets

FIG.10A PRIOR ART BASIC
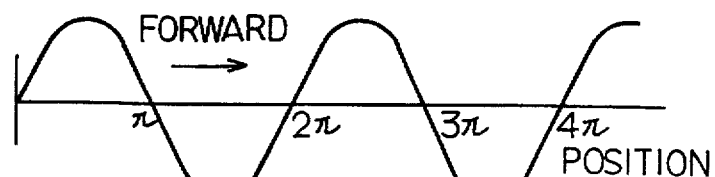
FIG.10B PRIOR ART 2nd HARMONIC
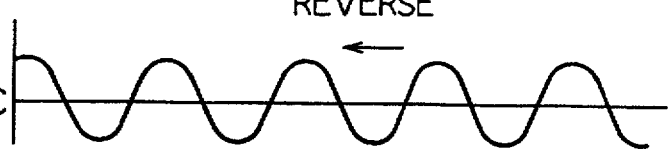
FIG.10C PRIOR ART 3rd HARMONIC
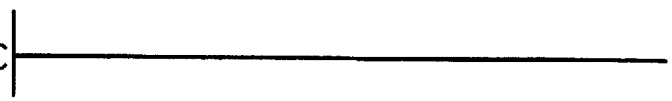
FIG.10D PRIOR ART 4th HARMONIC
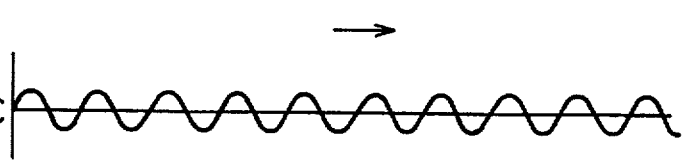
FIG.10E PRIOR ART 5th HARMONIC
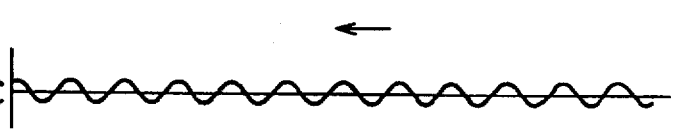
FIG.10F PRIOR ART 6th HARMONIC
FIG.10G PRIOR ART 7th HARMONIC
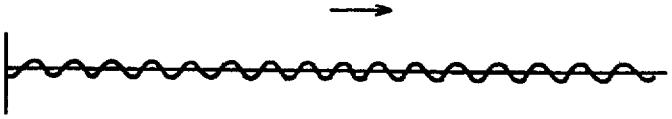
FIG.10H PRIOR ART 8th HARMONIC
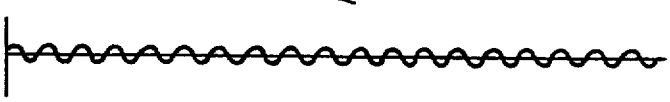
FIG.10I PRIOR ART 9th HARMONIC
FOURIER EXPANSION 5,691,590

ALTERNATOR WITH MAGNETIC NOISE REDUCTION MECHANISM

This is a continuation-in-part application of U.S. patent application Ser. No. 08/139,707 filed on Oct. 22, 1993, now abandoned, the content of which is incorporated herein by reference.

BACKGROUND OF THE INVENTION

1. Field of the Invention

The present invention relates to an alternator for a vehicle for charging a battery and supplying electrical power to various electrical loads of the vehicle and, more particularly, to an improvement in magnetic noise reduction of the alternator.

2. Description of the Related Art

Lately, development of a compact, low-noise and high electrical output alternator is required to meet increasing electrical loads and decreasing mounting space in an engine compartment of a vehicle.

However, the effort to develop such an alternator always faces overheating of a stator winding and higher magnetic noise. Accordingly, a lot of effort to improve cooling efficiency has been extended, that is, to improve effective dissipation of the heat generated in the stator winding and a reduction of magnetic noise from the alternator, while holding high output performance.

According to Japanese unexamined patent publication No. 3-226251 in which the so-called "2π (pi)/3, short pitch, lap-winding" is disclosed, electrical output from a stator of that winding system contains a lot of harmonic components in addition to the basic or fundamental wave as represented in FIGS. 10A through 10I and the harmonic components, particularly, second and fourth harmonics (FIGS. 10B and 10D) which have relatively large amplitude procedure undesired magnetic noise. Thus, as shown by a dotted line in FIG. 11, the noise level becomes considerably high.

SUMMARY OF THE INVENTION

It is an object of the present invention to provide an improved alternator for a vehicle with an effective magnetic noise reduction mechanism.

It is another object of the present invention to provide an improved alternator for a vehicle which is effective to improve cooling efficiency by preventing turbulence of cooling wind and to reduce sound generated by a cooling fan.

In the alternator according to the present invention, a dual stator winding system is employed to cancel the second and the fourth harmonics induced in the stator winding to effectively reduce the magnetic noise.

Further, in the alternator according to the present invention, an inner circumferential surface of a coil end is smoothed to prevent turbulence of cooling wind.

Still further, in the alternator according to the present invention, winding turns of a first winding group and a second winding group are made equal to each other so that the reduction of the magnetic noise is more reduced.

BRIEF DESCRIPTION OF THE DRAWINGS

In the accompanying drawings:

FIGS. 10A through 10I are waveform charts illustrating the Fourier expansion of electric output of the prior art alternator.

DETAILED DESCRIPTION OF PREFERRED EMBODIMENTS

Reference is made first to FIGS. 1 through 4 illustrating the first embodiment of the present invention.

Figure 1:
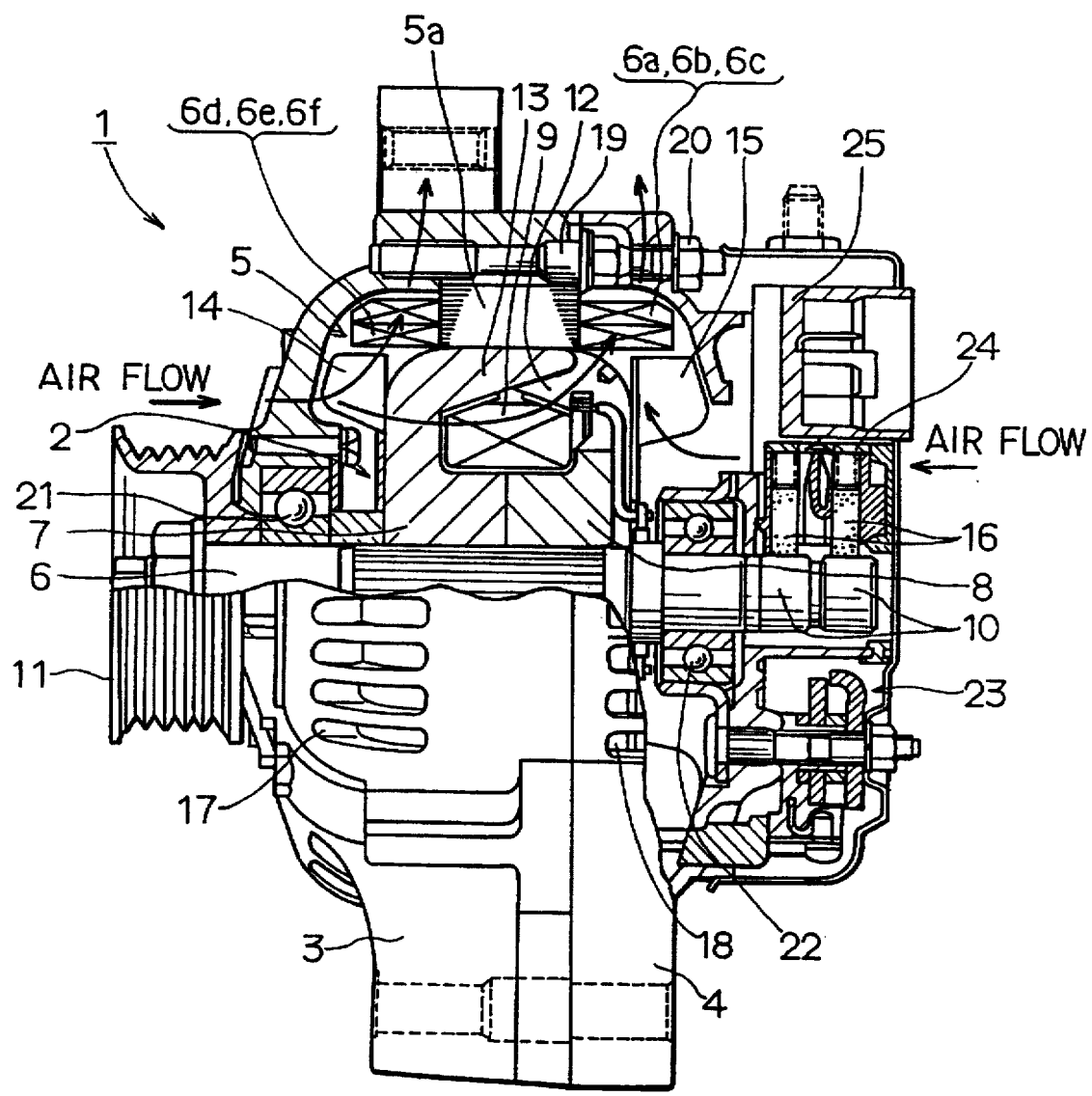
FIG. 1 is a side view illustrating, in cross section partly, the whole structure of an alternator according to a first embodiment of the present invention.

As shown in FIG. 1, an alternator 1 has a rotor 2, a cylindrical drive side end frame 3, a cylindrical rear side end frame 4, a stator 5, and other component parts including a shaft 6. The stator 5 includes a stator core 5a and stator coils 6a through 6f which is described in detail below. Ball bearings 21 and 22 are positioned in the central portions of the drive side end frame 3 and rear side end frame 4 to support the shaft 6 rotatably in the frames 3 and 4. At the end of the shaft 6, a V-ribbed pulley 11 is fixed to transmit the driving power of an engine (not shown) to the shaft 6. The rotor 2 fixed to the shaft 6 has pole cores 7 and 8, field coil 9 and a slip ring 10. The pole cores 7 and 8 hold the cylindrical field coil 9 therein and when exciting current is supplied to the field coil 9, all finger portions 13 of the pole core 8 become S-pole. Thus, the rotor 2 rotates to induce a rotating magnetic field.

The drive side end frame 3 and rear side end frame 4 hold the rotor 2 and the stator 5. Both end frames 3 and 4 have a lot of openings 17 and 18 for the introduction of cooling air flow and are directly fixed to each other by plural stud bolts 19 and nuts 20.

Cooling fans 14 and 15 are solidly fixed to the end faces of the pole cores 7 and 8 to introduce cooling air into the drive side and frame 3 and rear side end frame 4 through openings 17 and 18 of the end frames 3 and 4. The slip ring 10 is fixed to the other end of the shaft 6, and a brush 16 slides on the slip ring 10.

The brush 16, brush holder 24, a rectifier assembly 23, IC voltage regulator 25 and output terminal are also fixed to the inner face and outer face of the rear side end frame 4 by means of screw, etc. The rectifier assembly 23 has plural diodes (not shown) to convert alternating electrical voltage or current generated by the stator 5 into direct current. The rectifier is electrically connected to a battery and electrical loads in the vehicle. The brush holder 24 slidably holds brush 16. The IC voltage regulator 25 controls and keeps constant output voltage by switching transistors connected between the field coil 9 and electrical ground.

Figure 2:
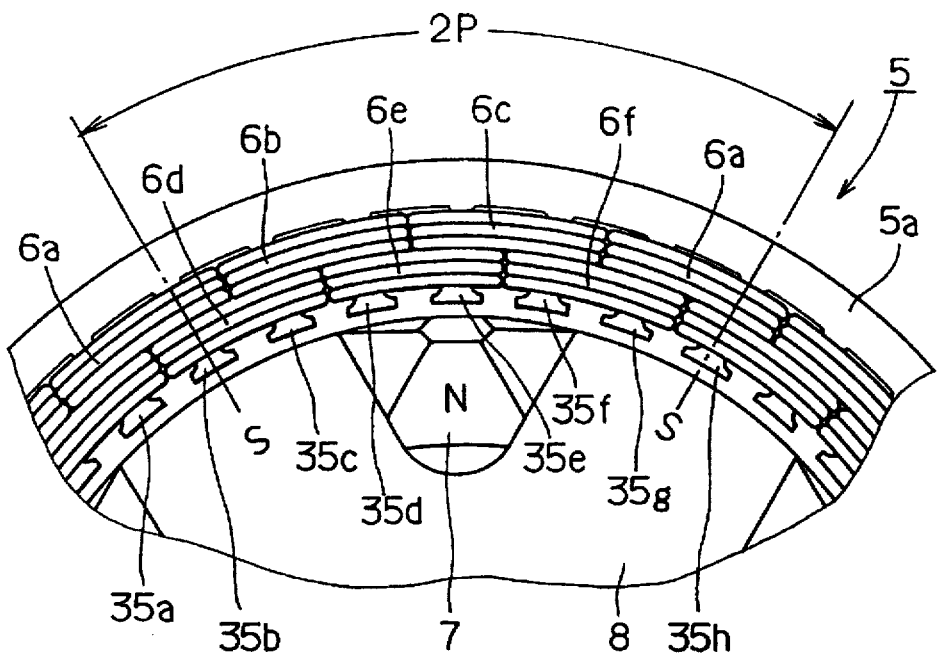
FIG. 2 is a schematic front view illustrating arrangement of a rotor and a stator according to the first embodiment.

As illustrated in detail in FIG. 2, the stator 5 includes the stator core 5a and three-phase stator coils 6a through 6f. The stator core 5a is press-fitted into the inside of the drive side end frame 3 and rear side end frame 4 to conduct the heat flow from the stator 5. The stator core 5a is made of magnetic iron sheets and forms proper magnetic flux circuits and introduces the magnetic flux from the pole cores 7 and 8 to make an effective interlinkage with the stator coils 6a through 6f.

Here, coil winding method and stator assembly manufacturing procedure are briefly described. Before the insertion work process of the stator coils 6a through 6f to the stator teeth 35a through 35h, respectively, the stator teeth 35a through 35h are formed to have U-shaped tips.

The stator coils 6a through 6f are previously wound on bars (not illustrated). The stator coils 6a through 6c and, then, the stator coils 6d through 6f are transferred sequentially to the stator teeth 35a through 35h. Thereafter, the U-shaped teeth tips are transformed and flared to T-shaped tips as shown in FIG. 2 by a certain mechanical means. The T-shaped tips of the teeth 35a through 35h change slots between the adjacent two teeth from open-slot to semi-closed slot and serve to hold the coils 6a through 6f in the slots radially tightly.

Thereafter, by impregnating a thermosetting resin between the stator coils and the stator core to fix the two, vibration can be reduced and magnetic noise can be reduced.

In the above assembly procedure, each coils 6a through 6f are separately wound and inserted into the teeth 35a through 35h not to make the crossed portions at the coil ends which are exposed outside the teeth 35a through 35h toward the end frames 3 and 4 as illustrated in FIGS. 1 and 2. In other words, each coil 6a through 6f are put into the slots so as to be separated at the radial center line of the slots shown in FIGS. 1 and 2.

By the winding arrangement mentioned above, the stator coils 6a through 6f can be formed so simple not to have the crossed portions at the foot (stator core side) of the coil ends and each coil has the same contact surface to the slots. Thus, this stator winding arrangement provides excellent stator which has effective cooling surface to the cooling air, because the elimination of the crossed portions at the foot of the coil ends of each coil to provides more wide and radially long cooling air channel.

Figure 3:
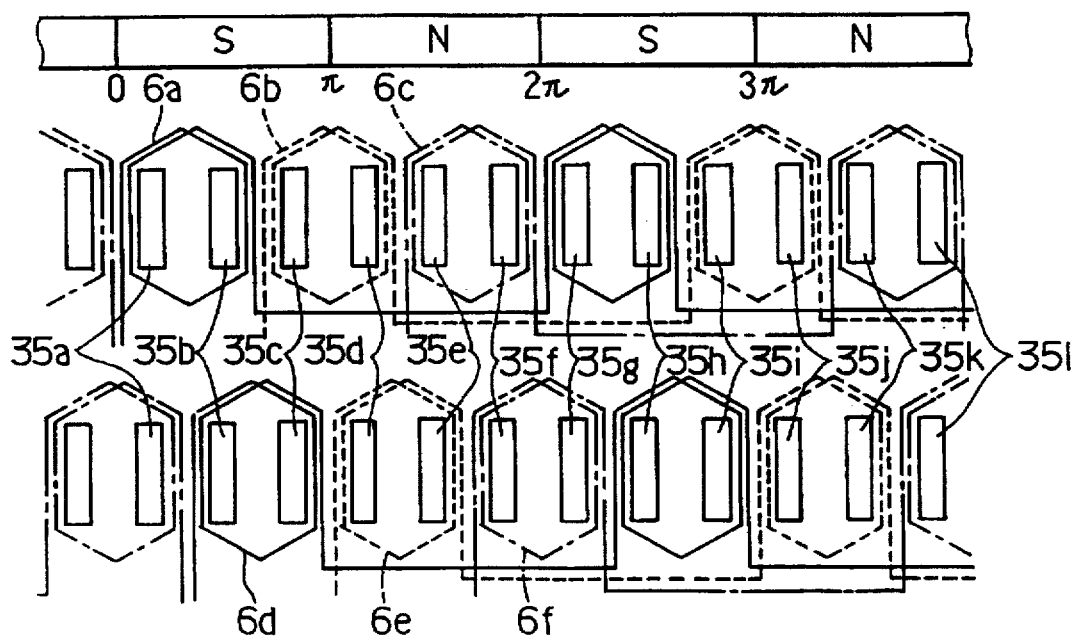
FIG. 3 is a winding diagram illustrating the relationship between stator teeth and rotor pole cores.

Next, the stator 5 having the coils 6a through 6f in dual stator winding system which is effective to reduce magnetic noise is described with reference to FIGS. 2 through 4.

A plurality of teeth 35a through 35h are provided in inner face of the stator core 5a of the stator 5 at a rate of six teeth per two pole-pitch (2p) as illustrated in FIG. 2. All stator coils 6a through 6f are wound on the two adjacent teeth and connected according to the winding diagram of FIG. 3. For example, the coil 6a is wound on the two teeth 35a and 35b, skips four teeth 35c to 35f and is wound again on the two adjacent teeth 35g and 35h. The coil 6b is wound on the teeth 35c and 35d, and is further wound on the teeth 35i and 35j skipping the four teeth 35e to 35h. The next coil 6c is also wound on the teeth 35e and 35f in the same manner. Thus, the first stator winding group comprising coils 6a through 6c is wound in contact with the stator core 5a and has no crossed portions thereamong.

Furthermore, in this dual stator winding system, the second stator winding group comprising coils 6e through 6f is wound radially inside on the above-mentioned first winding group. For example, the coil 6d is wound on the teeth 35b and 35c, skips the four teeth 35d to 35g, and is wound again on the teeth 35h and 35i. In the same manner, the coils 6e and 6f are also wound on the teeth 35d and 35e, and 35f and 35g, respectively. Thus, the coils 6d through 6f of the second stator winding group have no crossed portions thereamong, and good cooling efficiency is attained.

Figure 4:
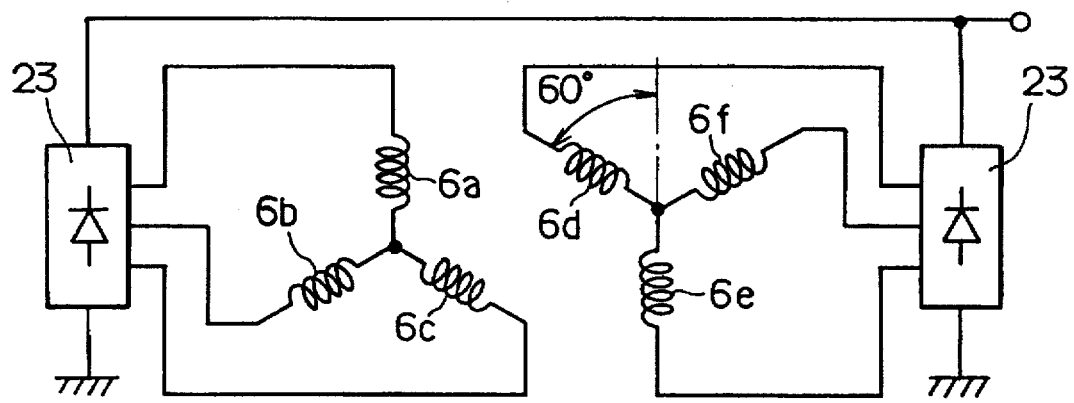
FIG. 4 is a wiring diagram of a dual stator winding and rectifier system according to first embodiment.

As illustrated in FIG. 4, the first group of three-phase coils 6a, 6b and 6c and the second group of three-phase coils 6d, 6e and 6f are connected in a two star connection. Both the first and second group stator windings are finally connected to two independent tow rectifiers 23.

The first group coils 6a, 6b and 6c induces an alternating current of advanced phase by π/3 radian in electrical angle as compared with the induced current of the second group coils 6d, 6e and 6f.

It is to be understood that the magnetic noise is caused by the fluctuation of the magnetic force at the air gap between the rotor 2 and the stator teeth 35a through 35h and the magnetic force depends on the magnetic field synthesized by the magnetic field induced by the rotor 2 and stator 5. The magnetic field induced by the stator 5 is called a counter-motive magnetic field. Fourier expansion analysis of the electrical output induced by the synthesized field in the prior art is illustrated in FIGS. 10A through 10I and mathematical expressions are given as follows.

Basic component=$F1 \times COS(wt-x+\alpha1)$

2nd harmonic=$F2 \times COS(wt+2x+\alpha2)$

4th harmonic=$F4 \times COS(wt-4x+\alpha4)$

F: Amplitude of each wave w: Speed=$2\pi f = PN\pi/60$ t: Time x: Stator position (radian)

α: Phase difference (radian)

The basic or fundamental component does not cause the fluctuation of the magnetic force and noise, because the component moves ahead synchronizing with the rotation of the rotor 2. However, the second harmonic causes the fluctuation of the magnetic force and has a frequency which is three times as high as the frequency of the fundamental component, because the second harmonic moves to the opposite rotating direction at a speed which is two times as fast as the speed of the fundamental component. The fourth harmonic also makes noise, because the fourth component moves to the same direction at a speed which is four times as fast as the speed of the fundamental component.

In order to cancel or reduce the second and fourth harmonics holding the reduction of fundamental component at a minimum, the dual stator winding system in the first embodiment gives the practical solution to magnetic noise reduction.

The electrical output of the dual stator windings which are wound giving phase difference by π/2 (radian) in electrical angle is mathematically expressed as follows.

Basic component=$(F1/2) \times COS(wt-x+\alpha1)+(F1/2) \times COS[wt-(x-\pi/3)+\alpha1]=0.866 \times F1 \times COS(wt-x+\beta1)$ Second harmonic=$(F2/2) \times COS(wt+2x+\alpha2)+(F2/2) \times COS[wt+2(x-\pi/3)+\alpha2]=0.500 \times F4 \times COS \times (wt+4x+\beta4)$ Fourth harmonic=$(F4/2) \times COS(wt-4x+\alpha2)+(F4/2) \times COS[wt-4(x-$ $\pi/3)+\alpha 4]=-0.500\times F4\times COS\times(wt+4x+\beta 4)$ β: Phase difference.

Figure 11:
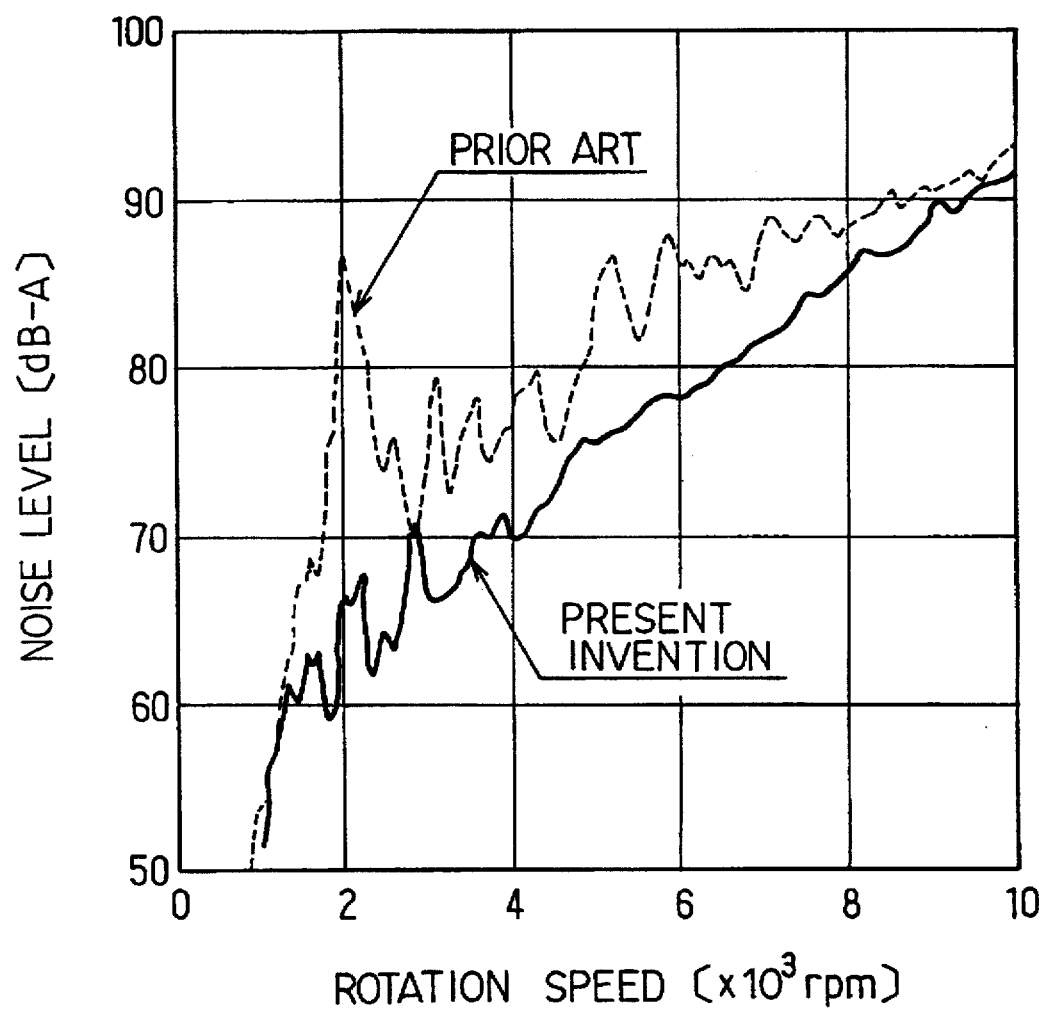
FIG. 11 is a graph illustrating the relationship between noise level and alternator speed according to the present invention as compared with the prior art.

In the dual winding and wiring system, the amplitude ratio between fundamental component and harmonics F2, F4/F1 results in 0.500/0.866=0.577 as compared with that of prior art. This means that the useless harmonic components can be reduced by 42% (1.00−0.577=0.423). As will be understood, the amplitude of the fundamental component which has a direct relationship with output voltage is decreased by 13% (1.00−0.868=0.134). However, this disadvantage can be compensated by the change of winding turns, that is, the number of conductors per coil. By the dual stator winding system which has π/3 radian output phase difference connected in parallel or series, the second and fourth harmonic components can be mostly cancelled and, accordingly the magnetic noise caused by the second and fourth harmonics can be reduced as shown by the solid line illustrated in FIG. 11.

The above-described dual winding system may be modified as follows.

Figure 5:
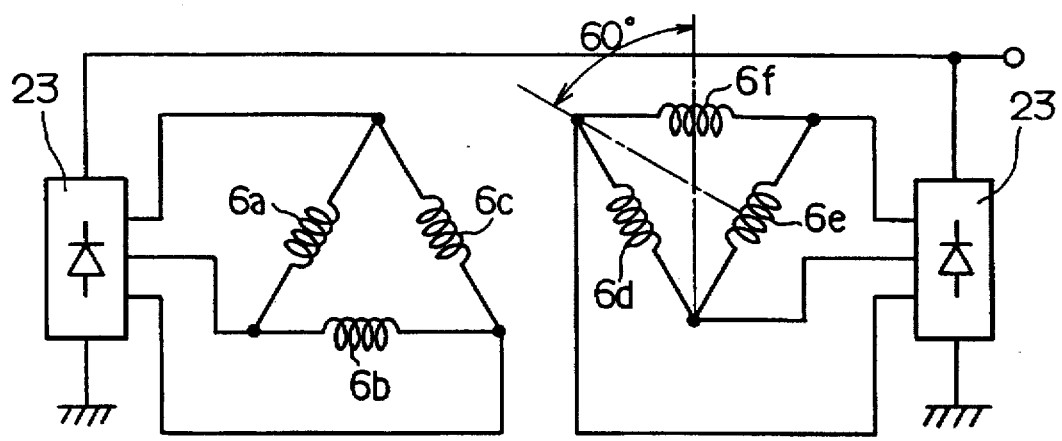
FIG. 5 is a wiring diagram of a dual stator winding and rectifier system according to a second embodiment.

The two parallel star connections in FIG. 4 may be changed to two parallel delta connections, as the second embodiment, as shown in FIG. 5.

Figure 6:
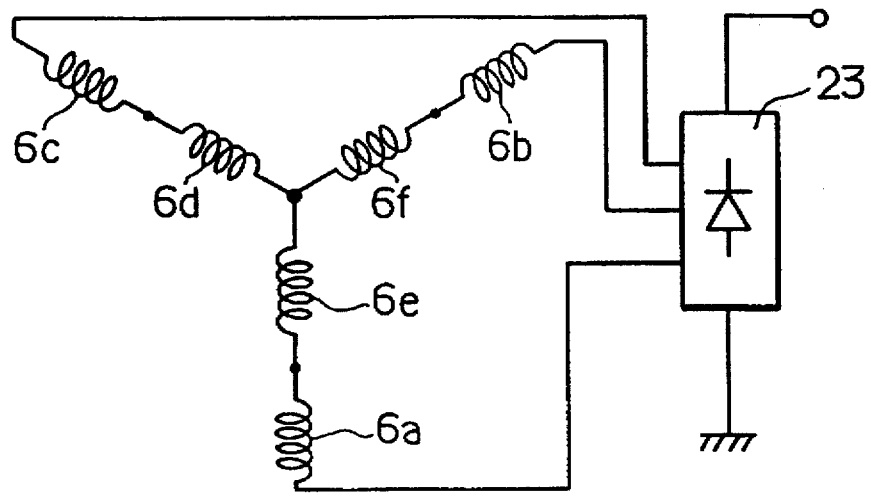
FIG. 6 is a wiring diagram of a dual stator winding and rectifier system according to a third embodiment of the present invention.
Figure 7:
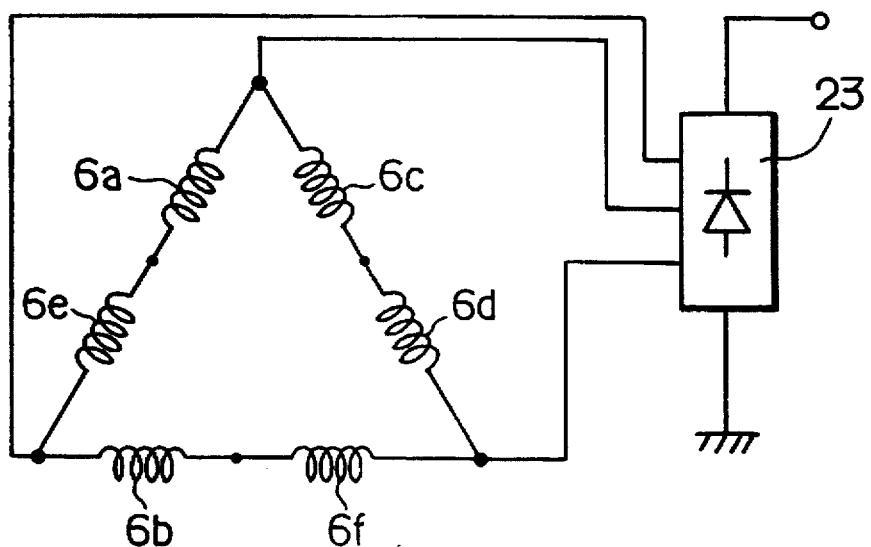
FIG. 7 is a wiring diagram of a dual stator winding and rectifier system according to a fourth embodiment of the present invention.

The parallel connections in FIGS. 4 and 5 may be changed to a series star connection and a series delta connection, as the third and fourth embodiments as shown in FIGS. 6 and 7, respectively. According to the third and fourth embodiments, only one rectifier 23 may be used.

Figure 8:
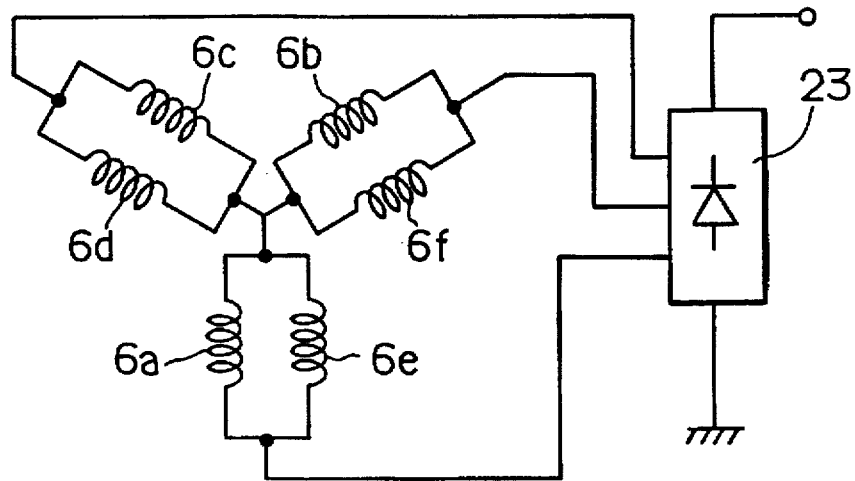
FIG. 8 is a wiring diagram of a dual stator winding and rectifier system according to a fifth embodiment of the present invention.

Further, three sets of stator coils 6a–6e, 6b–6f and 6c–6d connected in parallel may be connected in a star connection, as the fifth embodiment, as shown in FIG. 8. According to this embodiment, a higher electrical output may be obtained than in the embodiment shown in FIG. 6.

Figure 9:
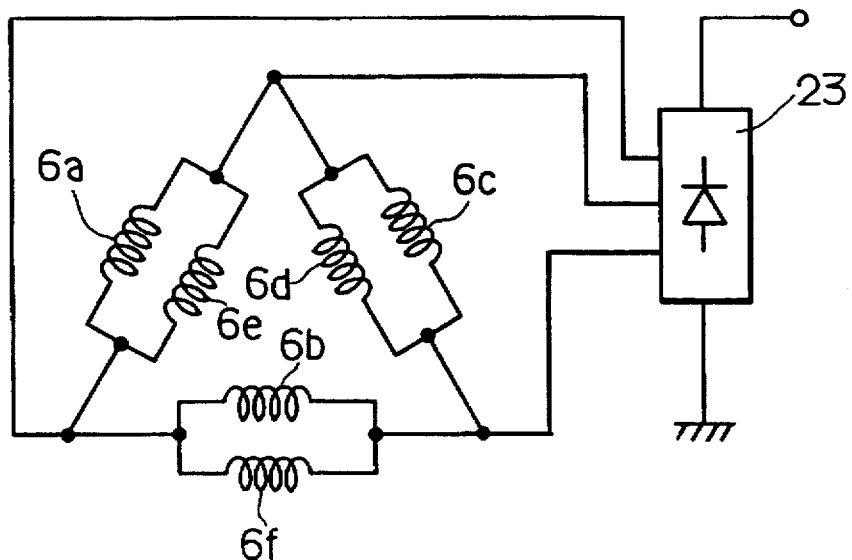
FIG. 9 is a wiring diagram of a dual stator winding and rectifier system according to a sixth embodiment of the present invention.

Still further, the three sets of coils in FIG. 8 may be connected in a delta connection, as the sixth embodiment, as shown in FIG. 9.

The present invention described above is not limited to the above first and second embodiments but may be modified in many ways without departing from the spirit of the present invention.

We claim:

1. An alternator for a vehicle comprising:
   a generally cylindrical frame;
   a rotor rotatably supported by said frame and having pole cores for generating a rotating magnetic field; and
   a stator fixedly supported by said frame,
   wherein said stator includes:
      a plurality of equi-angularly spaced teeth extending radially inwardly toward said rotor with respective slots between said plurality of teeth, said plurality of equi-angularly spaced teeth of said stator including six teeth per two pole-pitch of said rotor; and
      a plurality of stator coils having a first group of three stator coils and a second group of three stator coils, each of said first group of three stator coils and each of said second group of three stator coils being wound on one of pair of adjacent ones of said six teeth, said first group of three stator coils being shifted from said second group of three stator coils by π/3 radian in electrical angles.

2. An alternator for a vehicle according to claim 1, wherein:
   each of said first group of three stator coils is located at a first same radial position as circumferentially adjacent ones of said plurality of stator coils;
   each of said second group of three stator coils is located at a second same radial position as circumferentially adjacent ones of said plurality of stator coils; a respective boundary between each of said circumferentially adjacent ones of said plurality of stator coils in each slot is in line with a radial direction of said stator; and
   said circumferentially adjacent ones of said plurality of stator coils are in contact each other at said respective boundary.

3. An alternator for a vehicle according to claim 1, wherein:
   said first group of three stator coils are connected to form a first star connection and connected to a first rectifier; and
   said second group of three stator coils are connected to form a second star connection and connected to a second rectifier.

4. An alternator for a vehicle according to claim 1, wherein:
   said first group of three stator coils and said second group of three stator coils are connected in one of a star and a delta connection and connected to a single rectifier.

5. An alternator for a vehicle according to claim 1, wherein:
   a fan is fixed to said rotor for rotation with said rotor and generating cooling air flowing radially outwardly; and
   said plurality of stator coils form a smooth cylindrical surface at radially innermost coil ends thereof.

6. An alternator for a vehicle according to claim 1, wherein:
   each of said plurality of stator teeth includes a flared portion at a tip end of each of said plurality of stator teeth to hold said plurality of stator coils radially.

7. An alternator for a vehicle according to claim 6, wherein:
   said flared portion is formed by bending projection tips on each of said plurality of stator teeth with said plurality of stator coils inserted onto said respective ones of said plurality of stator teeth.

8. An alternator for a vehicle according to claim 1, wherein:
   numbers of turns of said first group of stator coils and said second group of stator coils are made equal to each other.

9. An alternator for a vehicle according to claim 1, wherein: said teeth and said coils are arranged to reduce magnetic noise.

10. An alternator for a vehicle according to claim 9, wherein:
    said teeth and said coils are arranged to reduce a second and a fourth harmonic components in an electric output produced from said stator thereby reducing magnetic noise.

11. An alternator for a vehicle according to claim 1, wherein:
    said first group of three stator coils are connected to form a first delta connection and connected to a first rectifier; and
    said second group of three stator coils are connected to form a second delta connection and connected to a second rectifier.

12. An alternator for a vehicle comprising:
    a rotor having a plurality of rotor-side magnetic poles for providing a rotating magnetic field when driven by a vehicle engine;
    a stator having a stator core and stator coils for providing a plurality of stator-side magnetic poles opposing to said rotor-side magnetic poles;

said stator coils being divided into a first group of coils and a second group of coils, said first group of coils being wound in three-phase for providing three stator-side magnetic poles per two magnetic pole-pitch of said rotor-side magnetic poles and said second group of coils being wound in three-phase for providing three stator-side magnetic poles per two magnetic pole-pitch of said rotor-side magnetic poles;

said stator-side magnetic poles provided by said first group of coils and said second group of coils being shifted $\pi/3$ radian in electrical angles from each other; and said stator-side magnetic poles provided by said first group of coils and said second group of coils having a part of said stator core common to each other.

13. An alternator for a vehicle according to claim 11, wherein:

said stator core has a plurality of teeth opposing said magnetic poles of said rotor;

said first group of coils are wound on different ones of said teeth from each other; and said second group of coils are wound on different ones of said teeth from each other.

14. An alternator for a vehicle according to claim 13, wherein:

said part of stator includes said teeth.

15. An alternator for a vehicle according to claim 12, further comprising:

an output circuit for independently converting two three-phase alternating current outputs generated by said first group of coils and said second group of coils into two direct current outputs and combining said two converted direct current outputs.

16. An alternator for a vehicle according to claim 12, further comprising:

an output circuit for combining the same phase of two three-phase alternating current outputs generated by said first group of coils and said second group of coils and converting said combined alternating current outputs into a direct current output.

* * * * *